(12) United States Patent
Orsley et al.

(10) Patent No.: US 7,924,265 B2
(45) Date of Patent: Apr. 12, 2011

(54) SYSTEM AND METHOD FOR EMULATING WHEEL-STYLE, ROCKER-STYLE, OR WHEEL-AND-ROCKER STYLE NAVIGATION WITH AN ANALOG POINTING DEVICE

(75) Inventors: Timothy J. Orsley, San Jose, CA (US); Jonah Harley, Mountain View, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 931 days.

(21) Appl. No.: 11/781,406

(22) Filed: Jul. 23, 2007

(65) Prior Publication Data
US 2009/0027333 A1     Jan. 29, 2009

(51) Int. Cl.
*G09G 5/08*     (2006.01)

(52) U.S. Cl. .................................... 345/157; 345/160

(58) Field of Classification Search .............. 345/157, 345/160, 173; 178/18.01; 715/718, 773, 715/780, 799, 810
See application file for complete search history.

(56) References Cited

U.S. PATENT DOCUMENTS

| | | | | |
|---|---|---|---|---|
| 6,359,615 | B1 * | 3/2002 | Singh | 345/173 |
| 7,493,339 | B2 * | 2/2009 | Nishimura et al. | 1/1 |
| 7,667,148 | B2 * | 2/2010 | Mansfield et al. | 200/5 R |

* cited by examiner

*Primary Examiner* — Abbas Abdulselam

(57) ABSTRACT

A pointing device includes a position determining mechanism and a control mechanism that has a field of motion associated therewith. The control mechanism can be an object a user moves with his or her finger or it can be the user's finger that he or she moves over a surface. The pointing device is used to control a selection box shown on a display screen. The pointing device can operate in one or more different modes when emulating wheel-style navigation, rocker-style navigation, or both wheel and rocker-style navigation.

19 Claims, 13 Drawing Sheets

SYSTEM AND METHOD FOR EMULATING WHEEL-STYLE, ROCKER-STYLE, OR WHEEL-AND-ROCKER STYLE NAVIGATION WITH AN ANALOG POINTING DEVICE

BACKGROUND

Computer operating systems commonly employ cursor-style navigation where a cursor shown on a display screen is controlled with a pointing device. FIG. 1 is a graphic illustration of a computer display screen in accordance with the prior art. Screen 100 includes icons 102, 104, 106, 108, 110, 112 that represent application, control, and utilities programs. Through the use of a pointing device, such as a computer mouse, a TrackPoint™, or a Trackpad™, a user moves cursor 114 around screen 100 to select and launch one or more programs.

Unlike computer operating systems, operating systems used with portable and handheld devices such as cell phones, digital music players, and personal digital assistants, typically use rocker-style navigation. With rocker-style navigation, a selection box is moved from one displayed item to an adjacently displayed item. For example, cell phone screen 200 in FIG. 2 includes icons 102, 104, 106, 108, 110, 112 and selection box 202. A user can move selection box 202 from icon 108 to icon 104, icon 106, or icon 112 through the use of a pointing device. One example of such a pointing device includes a 5-way navigation buttons.

Unfortunately, wheel-style and rocker-style navigation are not available with analog pointing devices. Analog pointing devices use an object the user moves with his or her finger or use the finger of the user to control a selection box or cursor on a display screen. For example, wheel-style and rocker-style navigation cannot be used with pointing devices such as slidepads, Trackpads™, and Trackpoints™. The pointing devices do not generate the necessary signals and the operating systems do not provide the functionality for wheel-style and rocker-style navigation.

SUMMARY

In accordance with the invention, a system and method for emulating wheel-style, rocker-style, or wheel-and-rocker style navigation with an analog pointing device are provided. A pointing device includes a position determining mechanism and a control mechanism that has a field of motion associated therewith. The control mechanism can be an object a user moves with his or her finger or it can be the user's finger that he or she moves over a surface. The pointing device is used to control a selection box shown on a display screen. The pointing device can operate in one or more different modes when emulating wheel-style navigation, rocker-style navigation, and/or wheel-and-rocker style navigation. One mode is a step mode where the pointing device outputs a single step motion that causes the selection box to move one adjacent position on the display screen. Another mode is the scroll mode where the pointing device repeatedly outputs single step modes that cause the selection box to scroll on the display screen. Another mode is a step-plus-scroll mode where the pointing device may or may not output a single step motion before repeatedly outputting single step motions that cause the selection box to scroll. The step-plus-scroll mode can cause the selection box to move in one dimension or in two dimensions.

DETAILED DESCRIPTION

Figure 1:
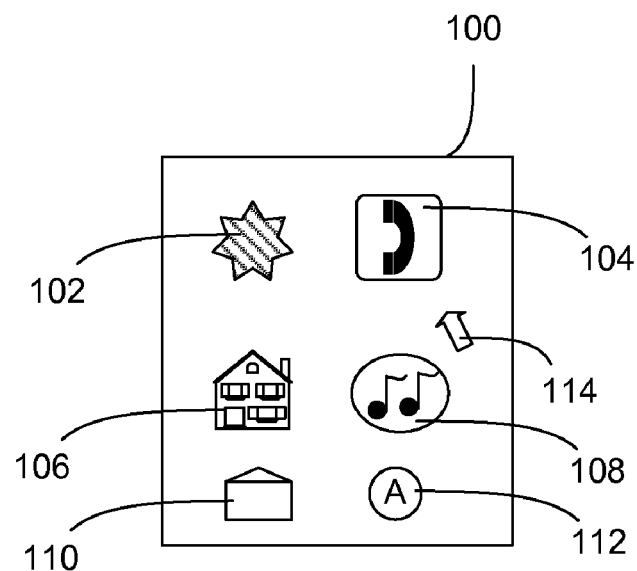
FIG. 1 illustrates a computer display screen according to the prior art.
Figure 2:
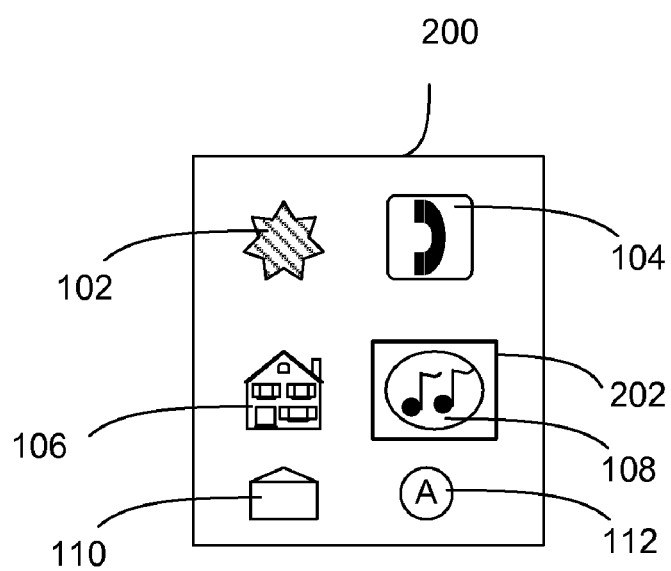
FIG. 2 illustrates a cell phone display screen according to the prior art.

The following description is presented to enable embodiments of the invention to be made and used, and is provided in the context of a patent application and its requirements. Various modifications to the disclosed embodiments will be readily apparent, and the generic principles herein may be applied to other embodiments. Thus, the invention is not intended to be limited to the embodiments shown but is to be accorded the widest scope consistent with the appended claims. Like reference numerals designate corresponding parts throughout the figures.

The present invention is described herein in conjunction with a puck-based pointing device. The puck operates as a control mechanism that changes the position of a cursor or a selection box shown on a display screen or highlights an item shown on the display screen. Embodiments in accordance with the invention, however, are not limited to this type of analog pointing device. Other types of analog pointing devices can be used to emulate wheel-style, rocker-style, or wheel-and-rocker style navigation as described in conjunction with FIGS. 7-17. Analog pointing devices include devices where a user moves the control mechanism around a field of motion using his or her finger and devices where a user moves his or her finger over a field of motion included on a surface of the control mechanism.

Figure 3A:
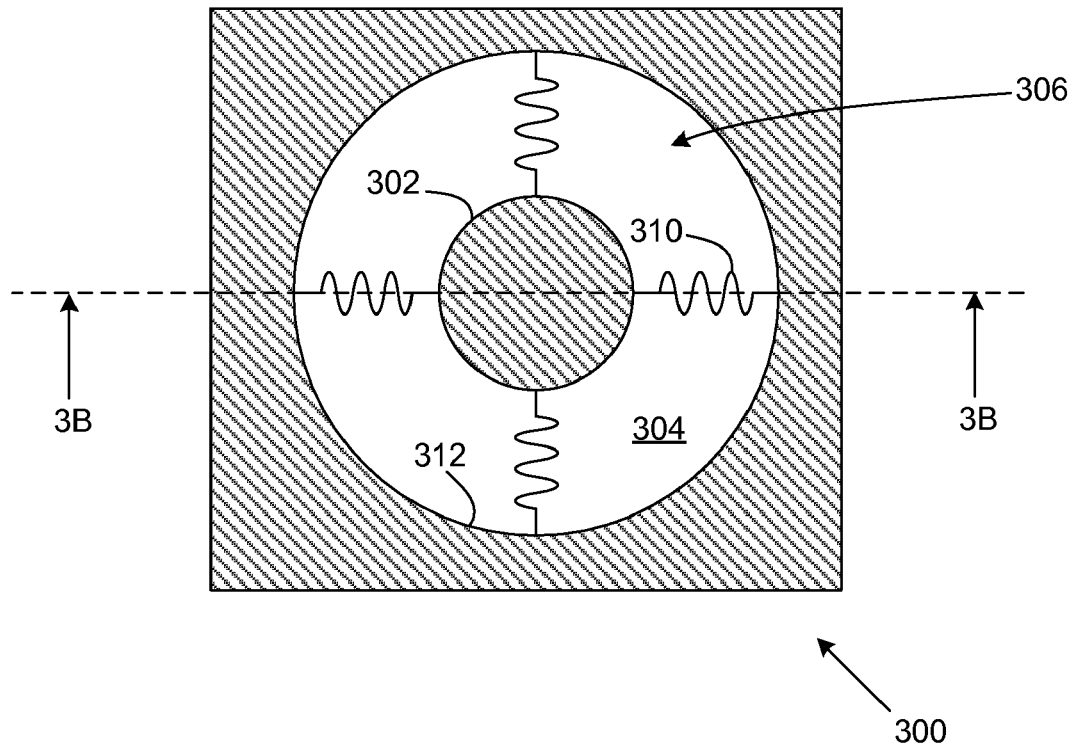
FIG. 3A illustrates a top view of a pointing device in an embodiment in accordance with the invention.

FIG. 3A illustrates a top view of a pointing device in an embodiment in accordance with the invention. Pointing device 300 includes puck 302 that moves over surface 304 within a puck field of motion 306 in response to a lateral force applied to puck 302. The force is typically applied to puck 302 by a user's finger, finger tip, thumb, thumb tip or multiple fingers (308 in FIG. 3B). Pointing device 300 also includes a position sensing mechanism (not shown) for determining the position of puck 302 within the puck field of motion 306. An exemplary position sensing mechanism is described in more detail in conjunction with FIGS. 4-6.

Puck 302 changes position when a user applies a force to puck 302. The change in the position of puck 302 over surface 304 is reported to a host device (not shown). When the user releases puck 302 by removing his or her finger (308 in FIG. 3B), puck 302 is returned to its centered position by springs 310 that connect puck 302 to edge plate 312 in an embodiment in accordance with the invention. In response to changes in the position of puck 302, rocker-style navigation is emulated using techniques that are described in more detail in conjunction with FIGS. 7-17.

Figure 3B:
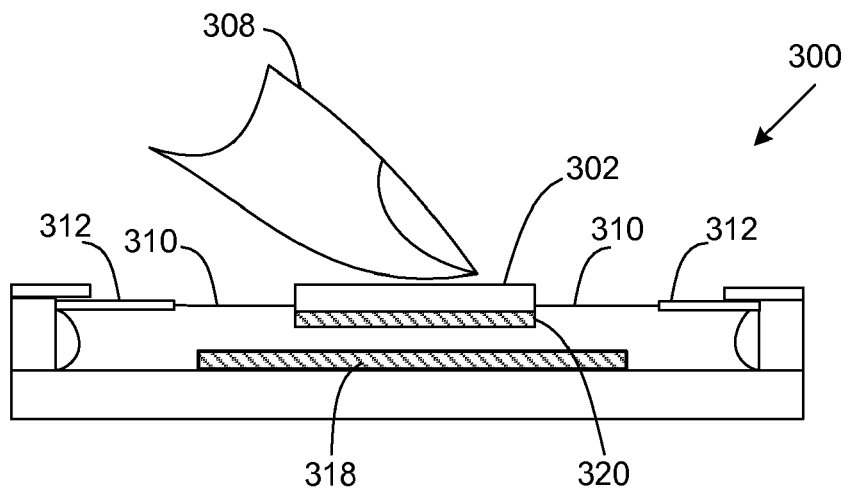
FIG. 3B is a cross-sectional view of the pointing device shown in FIG. 3A through line 3B-3B.

FIG. 3B is a cross-sectional view of the pointing device shown in FIG. 3A through line 3B-3B. Edge plate 312 has an opening that allows springs 310 to connected puck 302 to edge plate 312 and define the puck field of motion 306. As discussed earlier, in one embodiment in accordance with the invention, springs 310 return puck 302 to a predetermined location within the puck field of motion when puck 302 is released by the user. One example of a predetermined location within the puck field of motion is the center.

The position of puck 302 within the puck field of motion 306 can be determined by any one of a number of methods. One such position sensing method senses the capacitance between a set of drive and sense electrodes 318 and conductive puck plate 320 to determine the position of puck 302 within the puck field of motion 306. The position of puck 302 is determined by a controller in an embodiment in accordance with the invention.

Figure 4:
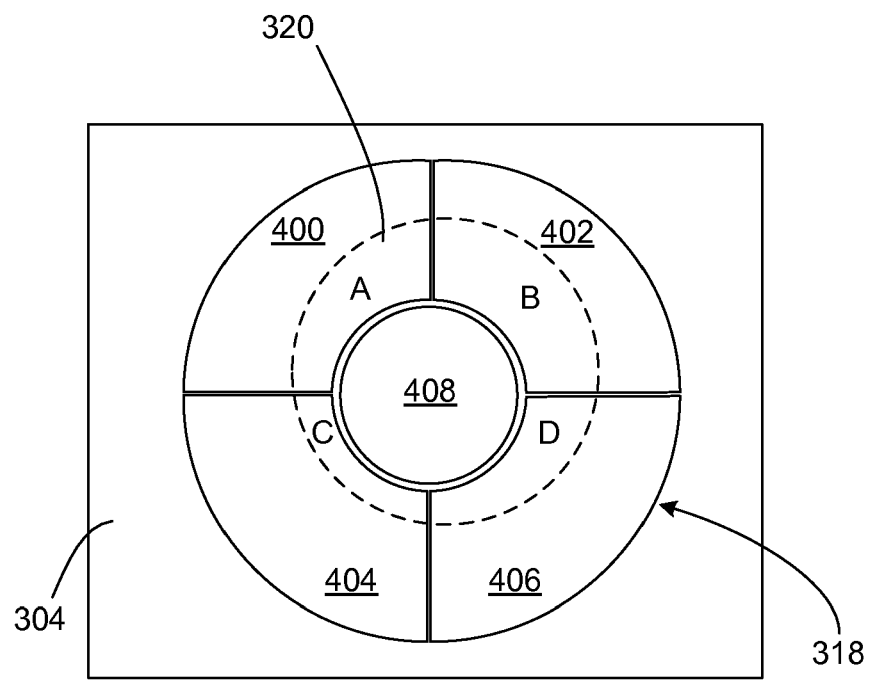
FIG. 4 is a top view of a portion of surface 304 shown in FIG. 3 over which a puck moves in an embodiment in accordance with the invention.

A capacitance-sensing technique for determining the position of puck 302 may be more easily understood with reference to FIG. 4. FIG. 4 is a top view of a portion of surface 304 shown in FIG. 3 over which puck 302 moves in an embodiment in accordance with the invention. Electrode 318 includes sense electrodes 400, 402, 404, 406 and drive electrode 408 that have terminals (not shown) connected to an external circuit (not shown). Embodiments in accordance with the invention are not limited to the use of four electrodes 400, 402, 404, 406. Any given number of electrodes can be used. Moreover, sense electrodes 400, 402, 404, 406 and drive electrode 408 can be shaped differently in other embodiments in accordance with the invention.

Puck 302 has a bottom surface that includes conductive puck plate 320, which is shown in phantom in FIG. 4. Electrodes 400, 402, 404, 406, 408 are electrically isolated from one another. Sense electrodes 400, 402, 404, 406 and drive electrode 408 are patterned on underlying surface 304 in an embodiment in accordance with the invention. This reduces the capacitance between electrodes 400, 402, 404, 406 408 and conductive puck plate 320, but can be practical for a substrate thickness of a few millimeters or less. The overlap between conductive puck plate 320 and each of sense electrodes 400, 402, 404, 406 depends on the position of the puck relative to sense electrodes 400, 402, 404, 406. The overlaps between conductive puck plate 320 and sense electrodes 400, 402, 404, 406 are denoted in FIG. 4 by the letters A, B, C, D, respectively.

Figure 5:
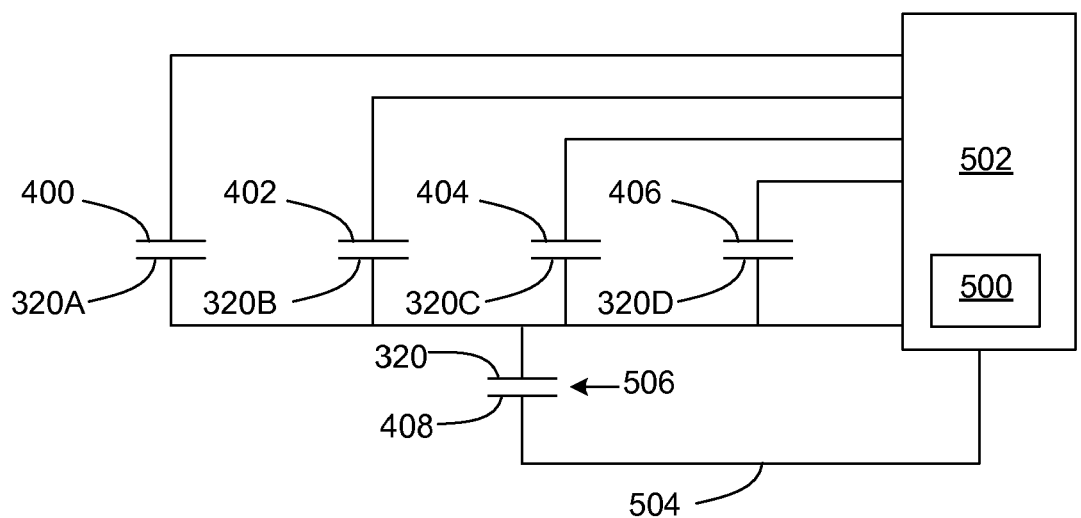
FIG. 5 is a schematic drawing of an equivalent circuit for sense electrodes 400, 402, 404, 406 and drive electrode 408 shown in FIG. 4.

Referring now to FIG. 5, there is shown a schematic drawing of an equivalent circuit for sense electrodes 400, 402, 404, 406, drive electrode 408, and puck plate 320 shown in FIG. 4. Drive circuitry 500 in controller 502 applies a signal to drive electrode 408 via line 504 to create capacitance coupling between drive electrode 408 and conductive puck plate 320. This capacitive coupling is represented by capacitor 506. The portion of conductive puck plate 320 that overlaps electrode 400 forms a parallel plate capacitor (400, 320A) that has a capacitance that is proportional to overlap A in FIG. 4. Similarly, the portion of conductive puck plate 320 that overlaps electrode 402 forms a parallel plate capacitor (402, 320B) that has a capacitance that is proportional to overlap B, and so on.

The position of conductive puck plate 320 relative to sense electrodes 400, 402, 404, 406 is determined by measuring the capacitance between drive electrode 408 and conductive puck plate 320 and conductive puck plate 320 and each sense electrode 400, 402, 404, 406. This determination is made by controller 502 in an embodiment in accordance with the invention. Controller 502 may be included in a pointing device (e.g., 300 in FIG. 3) or may be included in a host device (not shown) that includes pointing device 300.

Figure 6:
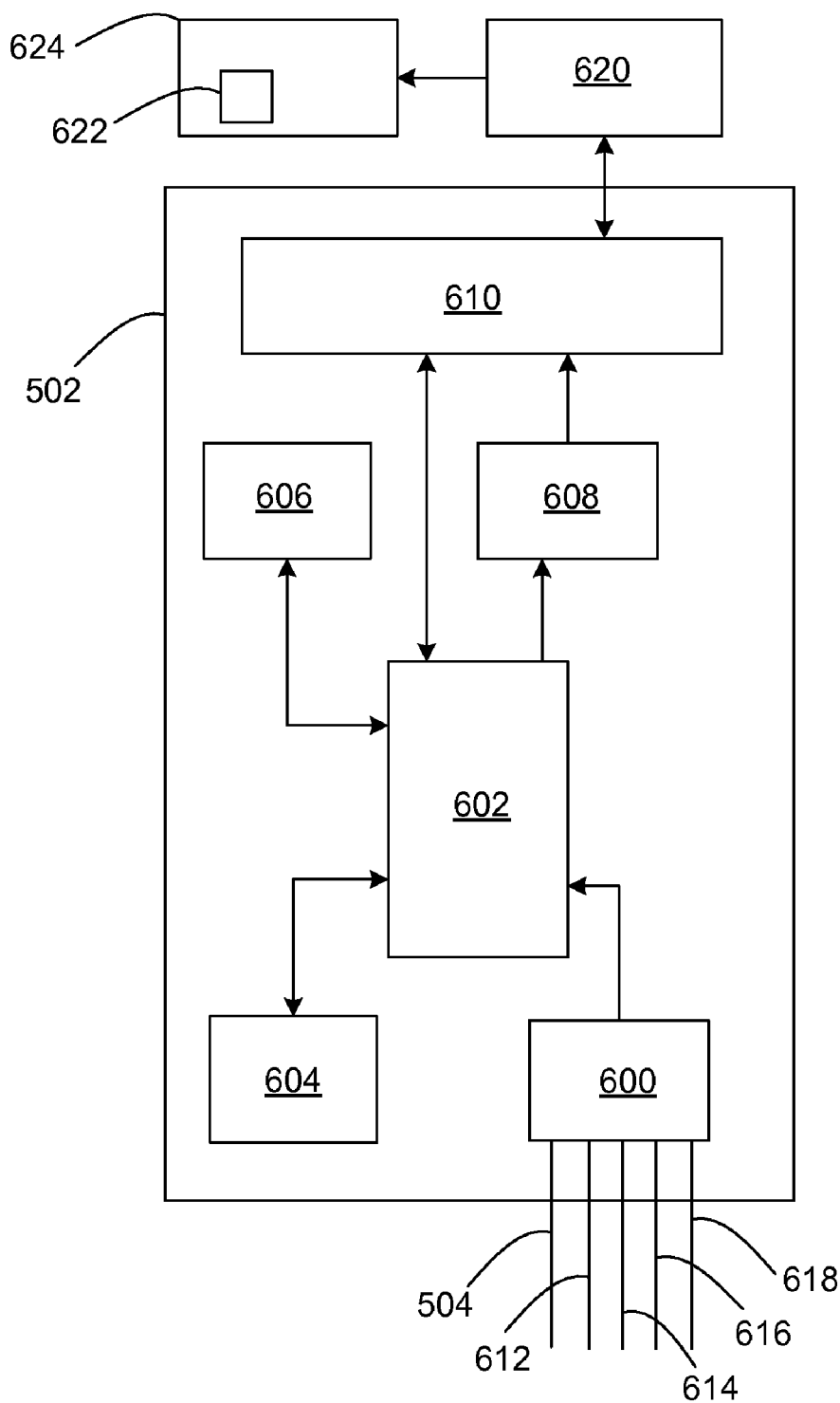
FIG. 6 is a block diagram of controller 502 shown in FIG. 5 in an embodiment in accordance with the invention.

FIG. 6 depicts a block diagram of controller 502 shown in FIG. 5 in an embodiment in accordance with the invention. Embodiments in accordance with the invention, however, are not limited to the use of a controller as a position determining mechanism. Other devices can be used to determine the position of puck 302 within puck field of motion 306. By way of example only, a state machine can be used instead of a controller.

Controller 502 includes analog interface 600, pointing device microprocessor 602, static memory 604, dynamic memory 606, motion buffer 608, and input/output component 610. A capacitance value between drive electrode 408 and each sense electrode 400, 402, 404, 406 is received by analog interface 600 via input lines 612, 614, 616, 618, respectively. Analog interface 600 converts the capacitance measurements into representative digital values.

Pointing device microprocessor 602 receives the representative digital values and determines the position of puck 302 within the puck field of motion 306 using navigation firmware stored in static memory 604. The representative digital values are compared to previous values to determine the displacement, movement direction, and velocity of puck 302. The position information regarding the puck can be stored in optional motion buffer 608 prior to being received by input/output component 610. Input/output component 610 transfers the position information to host microprocessor 620, which in turn moves selection box 622 on host display 624 in response to receiving revised position information from controller 502.

Selection box 622 is shown in a conventional square shape in FIG. 6. Selection box 622 can assume different shapes in other embodiments in accordance with the invention. By way of example only, selection box 622 can be a partially transparent highlight bar, a blinking line, or an outline of a different shape, such as a rectangle or oval in other embodiments in accordance with the invention.

While the above-described pointing device embodiment utilizes capacitive measurements for sensing the distance between puck 302 and sense electrodes 400, 402, 404, 406 and the position of puck 302 within the puck field of motion 306, other embodiments in accordance with the invention can use different position sensing mechanisms. By way of example only, the position of puck 302 in the puck field of motion 306 can be ascertained using optical sensors such as those used in a conventional optical mouse.

Figure 7:
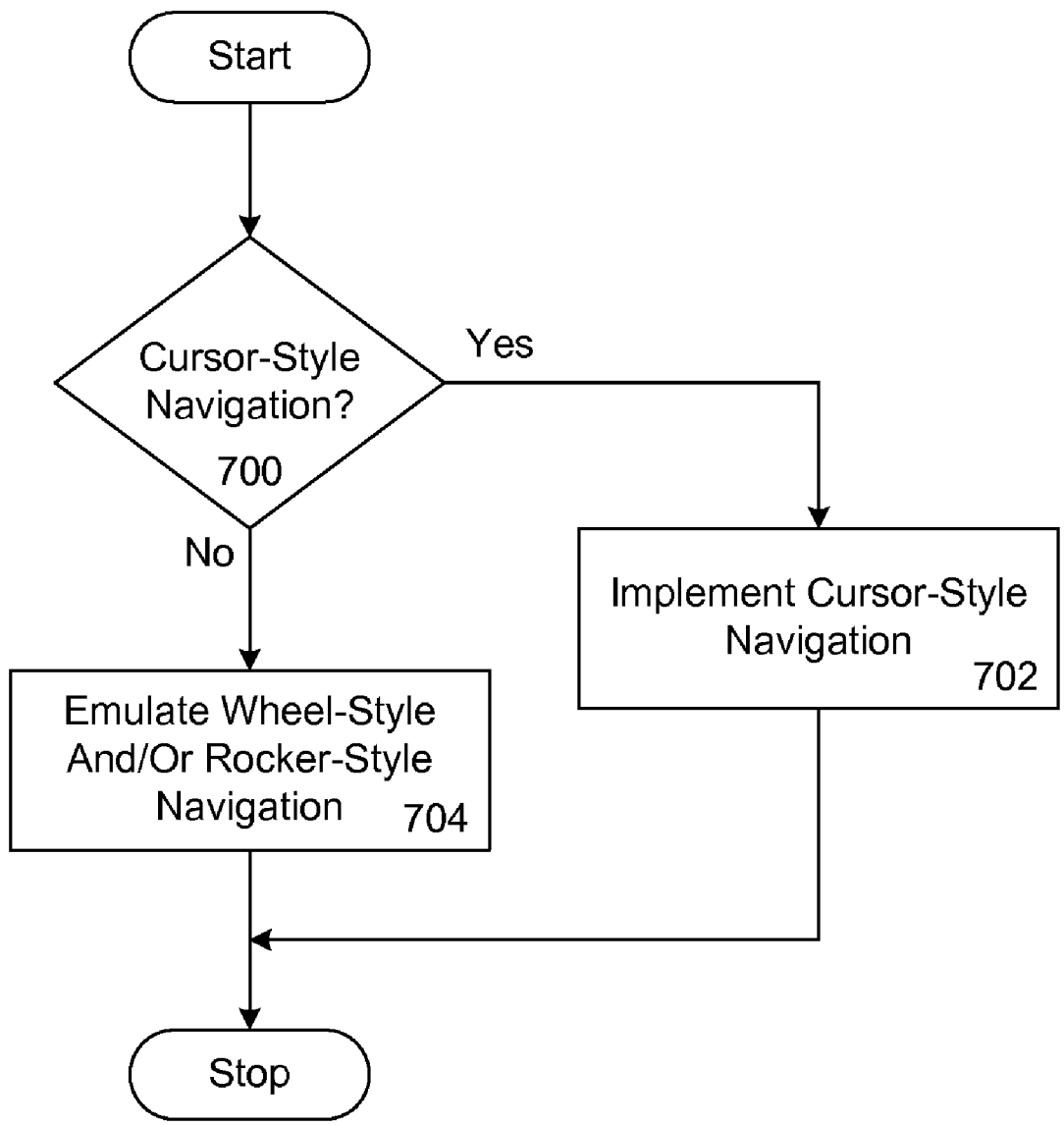
FIG. 7 is a flowchart of a method for display screen navigation in an embodiment in accordance with the invention.

Referring now to FIG. 7, there is shown a flowchart of a method for display screen navigation in an embodiment in accordance with the invention. Initially a determination is made at block 700 as to whether cursor-style navigation will be used with a pointing device. If so, the method passes to block 702 where cursor-style navigation is implemented. Alternatively, the method passes to block 704 when the pointing device will be used to emulate wheel-style and/or rocker-style navigation. Emulating wheel-style and/or rocker-style navigation is discussed in more detail in conjunction with FIGS. 8-17.

Figure 8:
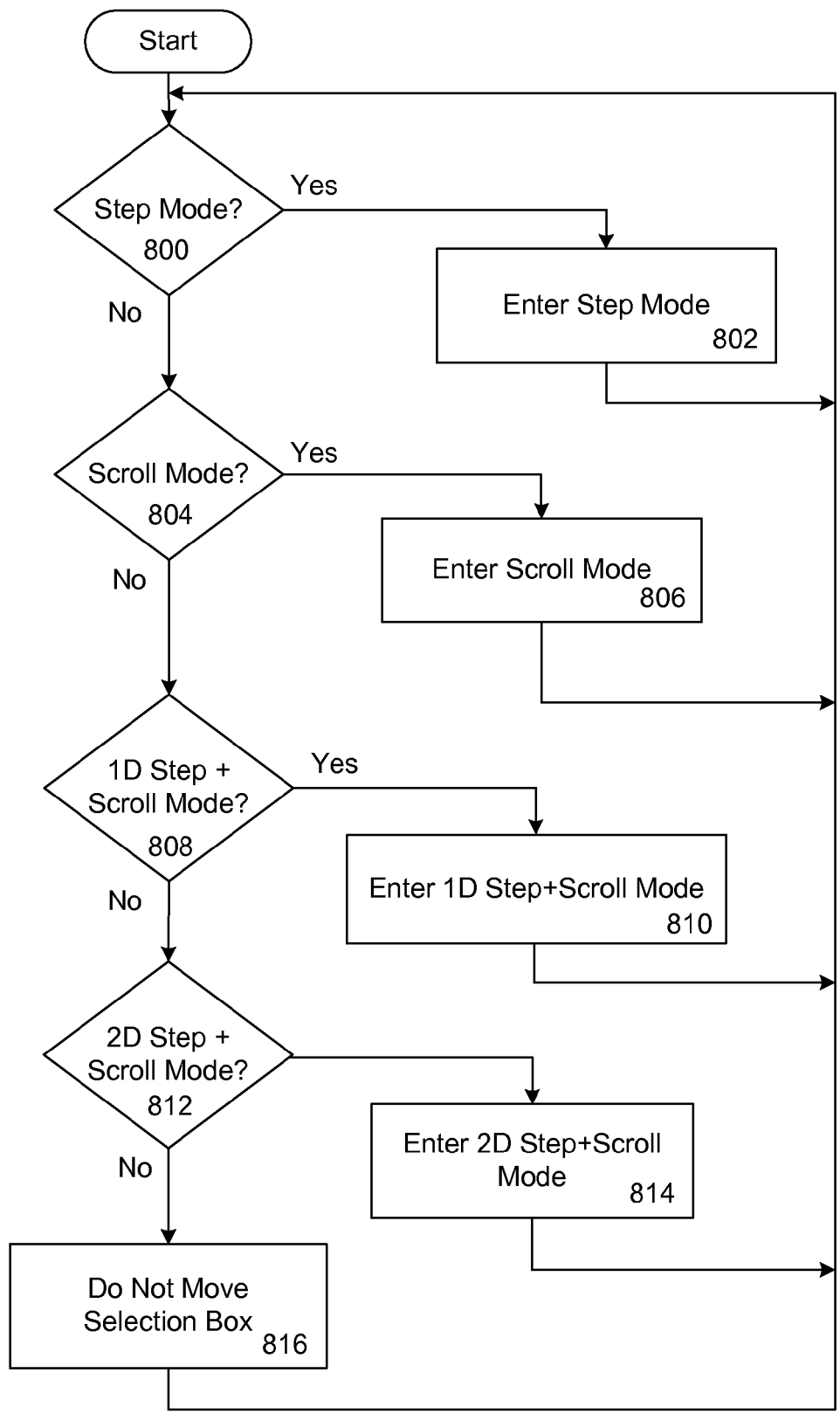
FIG. 8 is a flowchart of a method for implementing block 704 shown in FIG. 7 in an embodiment in accordance with the invention.

FIG. 8 is a flowchart of a method for implementing block 704 shown in FIG. 7 in an embodiment in accordance with the invention. Initially a determination is made as to whether the pointing device is to enter a step mode in response to a user moving a puck (block 800). The step mode is a mode that causes a selection box to move one adjacent position from its current position. For example, the selection box moves one position or icon to the right in response to a user moving the puck to the right.

If the pointing device is to enter the step mode, the pointing device enters the step mode and generates an output that causes the selection box to move one step based on the position of the puck (block 802). If the pointing device is not entering the step mode, a determination is made at block 804 as to whether the pointing device is to enter the scroll mode. The scroll mode produces a scrolling motion with a selection box.

If the pointing device is to enter the scroll mode, the pointing device enters the scroll mode and generates an output that causes the selection box to scroll based on the motion of the puck (block 806). If the pointing device is not entering the scroll mode, a determination is made at block 808 as to whether the pointing device is to enter a one dimensional step-plus-scroll mode. The one dimensional step-plus-scroll mode combines the step and scroll modes to produce scroll movement in one dimension. In the one dimensional step-plus-scroll mode, a selection box may or may not be moved one adjacent step or position before scrolling in the same dimension based on the motion of the puck.

If the pointing device is to enter the one dimensional step-plus-scroll mode, the pointing device enters the one dimensional step-plus-scroll mode at block 810 and generates an output that causes the selection box to scroll based on the motion of the puck. If the pointing device is not entering the one dimensional step-plus-scroll mode, a determination is made at block 812 as to whether the pointing device is to enter the two dimensional step-plus-scroll mode. The two dimensional step-plus-scroll mode combines the step and scroll modes to produce scroll movement in one dimension or in two dimensions. In the two dimensional step-plus-scroll mode, a selection box is moved one adjacent step or position and the selection box then scrolls in either the same dimension or in a different direction based on the direction the selection box was initially moved by the user and the subsequent motion of the puck.

If the pointing device is to enter the two dimensional step-plus-scroll mode, the pointing device enters the two dimensional step-plus-scroll mode and generates an output that causes the selection box to move and then scroll (block 814).

If the pointing device is not entering the two dimensional step-plus-scroll mode, the pointing device does not generate an output and the selection box is not moved, as shown in block 816.

Figure 9:
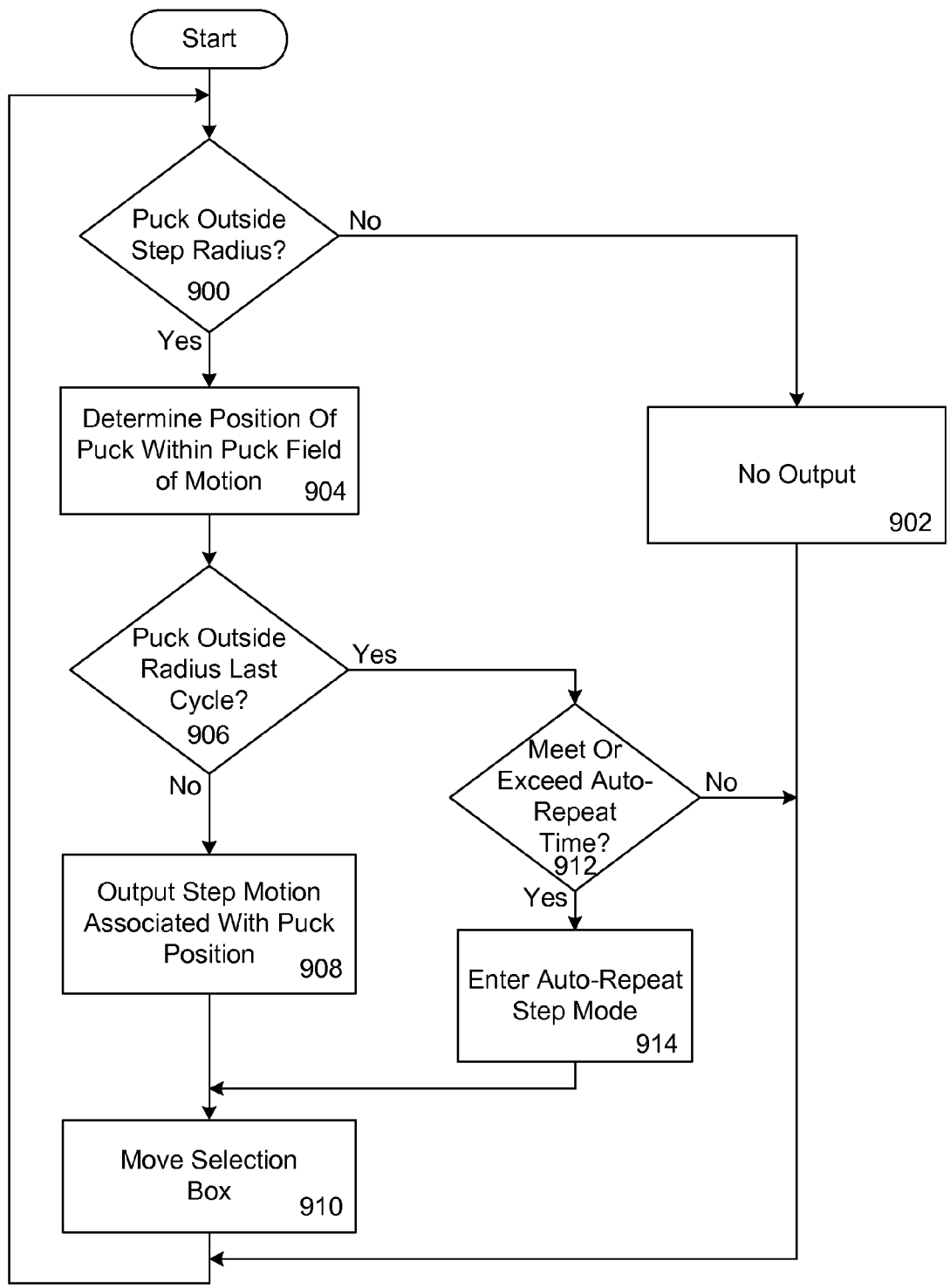
FIG. 9 is a flowchart of a method for implementing block 802 shown in FIG. 8 in an embodiment in accordance with the invention.

Referring now to FIG. 9, there is shown a flowchart of a method for implementing block 802 shown in FIG. 8 in an embodiment in accordance with the invention. Initially a determination is made at block 900 as to whether a user has moved the puck outside a step radius. The pointing device does not generate an output when the user has not moved the puck outside the step radius (block 902).

Figure 10:
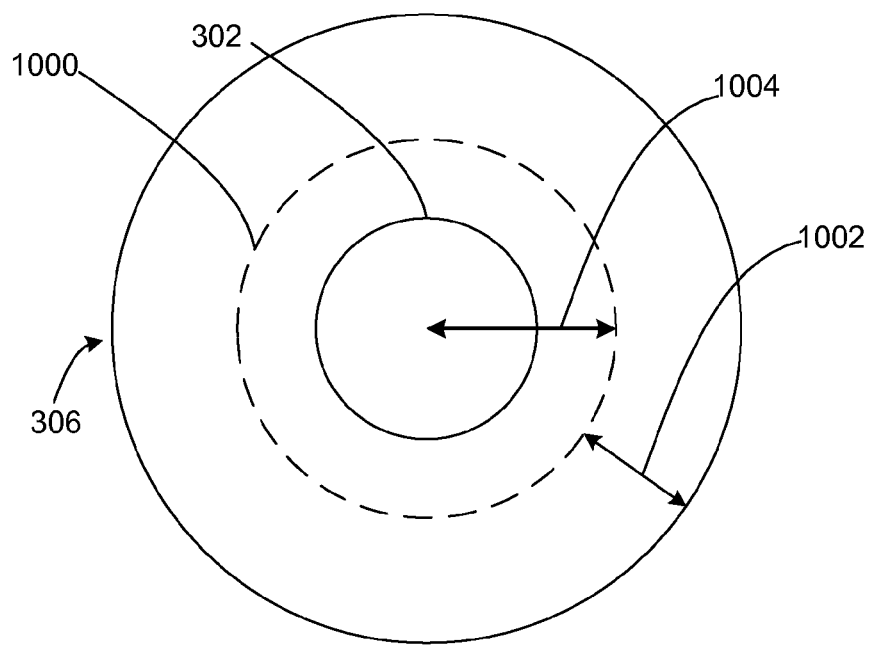
FIG. 10 is a top view of puck field of motion 306 shown in FIG. 3 that is used to illustrate a method for implementing block 900 shown in FIG. 9 in an embodiment in accordance with the invention.

FIG. 10 is a top view of a puck field of motion (e.g. 306 of FIG. 3) used to illustrate block 900 in an embodiment in accordance with the invention. A step radius 1000 is logically positioned around the resting position of puck 302. A point in puck 302 must move a minimum distance 1004 before the process passes to block 904. The center of the conductive puck plate (e.g. 320 in FIG. 3B) must transit step radius 1000 and move into region 1002 before the process passes to block 904 in an embodiment in accordance with the invention.

Minimum distance 1004 can be any given distance. When minimum distance 1004 is greater than zero, a user is able to apply a small amount of force to puck 302, such as when the user rests his or her finger on puck 302 and causes a slight displacement of puck 302 from its resting position or center, without causing movement in the selection box.

Figure 11:
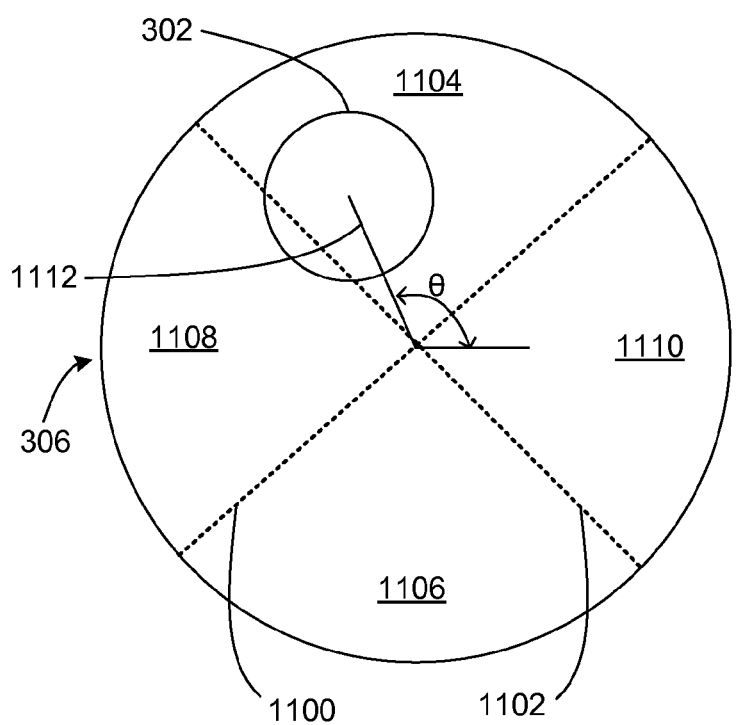
FIG. 11 is a top view of puck field of motion 306 shown in FIG. 3 that is used to illustrate a first method for implementing block 904 in an embodiment in accordance with the invention.

Referring again to FIG. 9, when the user has moved the puck or a portion of the puck past the step radius, the method passes to block 904 where the position of the puck within the puck field of motion is determined (block 810). FIG. 11 is a top view of puck field of motion 306 shown in FIG. 3A that is used to illustrate block 904 in an embodiment in accordance with the invention. Lines 1100, 1102 are positioned within puck field of motion 306 to logically divide puck field of motion into four sections 1104, 1106, 1108, 1110. Other embodiments in accordance with the invention can logically divide the puck field of motion into any given number of sections (M sections). For example, the puck field of motion may be divided into two sections (M=2) that provide only up or down steps or left or right steps. As another example, the puck field of motion may be divided into eight sections (M=8) providing up (i.e., north), down (i.e., south), left (i.e., west), right (i.e., east), northwest, northeast, southwest, and southeast step movements.

When a user applies a force to the puck, the user displaces the puck by a particular distance (e.g., 1112) and in a direction defined by angle θ (theta) with respect to the resting position of puck 302. The position of puck 302 is determined using the distance and the angle θ. The distance is used to determine whether the center of puck 302 has moved past the step radius (e.g., 1000 in FIG. 10). The angle θ and the locations of lines 1100, 1102 are used to determine which logical section the puck resides. In the embodiment shown in FIG. 11, sections 1104, 1106 represent up and down steps, respectively, and sections 1108, 1110 represent left and right steps, respectively.

For example, when puck 302 or some point on puck 302 (e.g., center of the conductive puck plate) moves into section 1104 the selection box is moved up one adjacent step or position in an embodiment in accordance with the invention. Similarly, the selection box is moved right one step or position when puck 302 or some point on puck 302 (e.g., center of the conductive puck plate) moves into section 1110.

Referring again to FIG. 9, a determination is then made at block 906 as to whether the puck was outside the step radius in the previous cycle. A processor (e.g. pointing device microprocessor 502 in FIG. 5) operating at a given rate, such as, for example, 100 Hertz or cycles, repeatedly executes the method shown in FIG. 9 in an embodiment in accordance with the invention. Consequently, the position of the puck with respect to the step radius is determined each cycle in an embodiment in accordance with the invention.

If the puck was not outside the step radius in the previous cycle, the process passes to block 908 where the pointing device outputs the step motion information. The selection box is then moved one position in a direction that corresponds to the direction of puck movement. This step is shown in block 910.

If the puck was outside the step radius in the previous cycle, a determination is made at block 912 as to whether a time or count for an auto-repeat mode has been met or exceeded. If so, the pointing device enters an auto-repeat step mode (block 914) and the selection box is moved accordingly (block 910). To enter the auto-repeat mode, the user moves the puck past the step radius and holds the puck in a fixed position in an embodiment in accordance with the invention. The selection box is then moved repeatedly at a fixed or potentially accelerating rate of speed in a direction corresponding to the direction of the movement of the puck. For example, the rate could be variable using the offset of the puck from its center or resting position as a "gas pedal" to determine the rate of speed.

Figure 12:
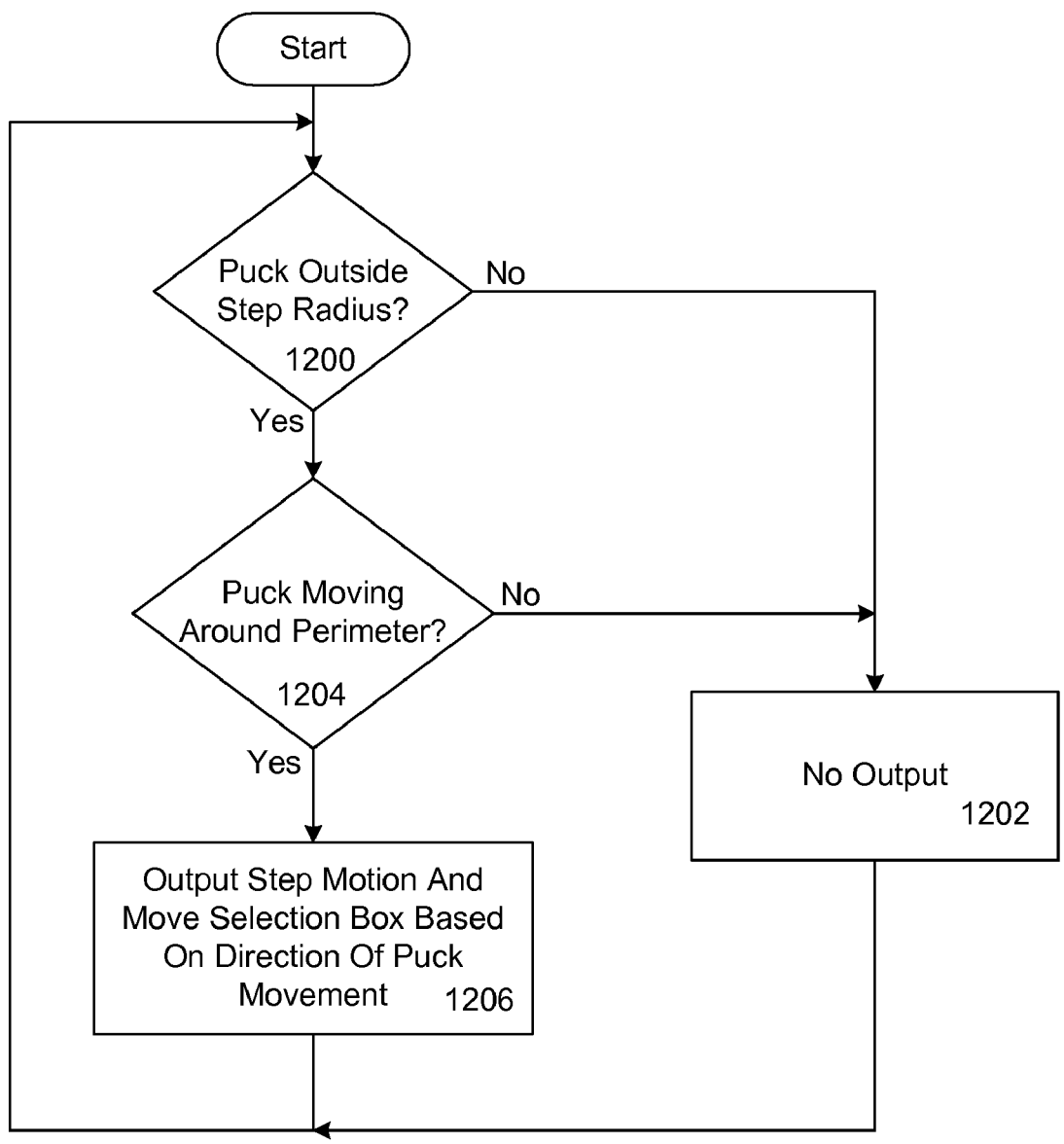
FIG. 12 is a flowchart of a method for implementing block 806 shown in FIG. 8 in an embodiment in accordance with the invention.

Referring now to FIG. 12, there is shown a flowchart of a method for implementing block 806 shown in FIG. 8 in an embodiment in accordance with the invention. Initially a determination is made at block 1200 as to whether the user has moved the puck outside the step radius. The techniques described in conjunction with FIGS. 10 and 11 are used to determine whether the puck is outside the step radius in an embodiment in accordance with the invention. The pointing device does not generate an output if the user has not moved the puck past the step radius (block 1202).

If the user has moved the puck outside the step radius, a determination is then made as to whether the user is moving the puck around the perimeter of the puck field of motion (block 1204). By way of example only, the pointing device shown in FIG. 3 enters the scroll mode when a user moves the puck near edge plate 312 and then moves the puck in a circular direction around the puck field of motion 306.

The pointing device does not generate an output if the user is not moving the puck around the perimeter. If the user is moving the puck around the perimeter of the puck field of motion, the pointing device outputs a step motion that causes the selection box to move in a direction that corresponds to the direction of the movement of the puck (block 1206). The direction of the movement of the selection box is based on whether the user is moving the puck in a clockwise or counter-clockwise circular direction. The selection box moves down when the puck is moved clockwise around the puck field of motion and up when the puck is moved counter-clockwise in an embodiment in accordance with the invention. When the pointing device is in the scroll mode, the pointing device repeatedly outputs a step motion that causes the selection box to scroll as long as the user moves the puck around the perimeter of the puck field of motion. The number of steps per rotation is variable and unrelated to M (i.e., the number of sections).

Figure 13:
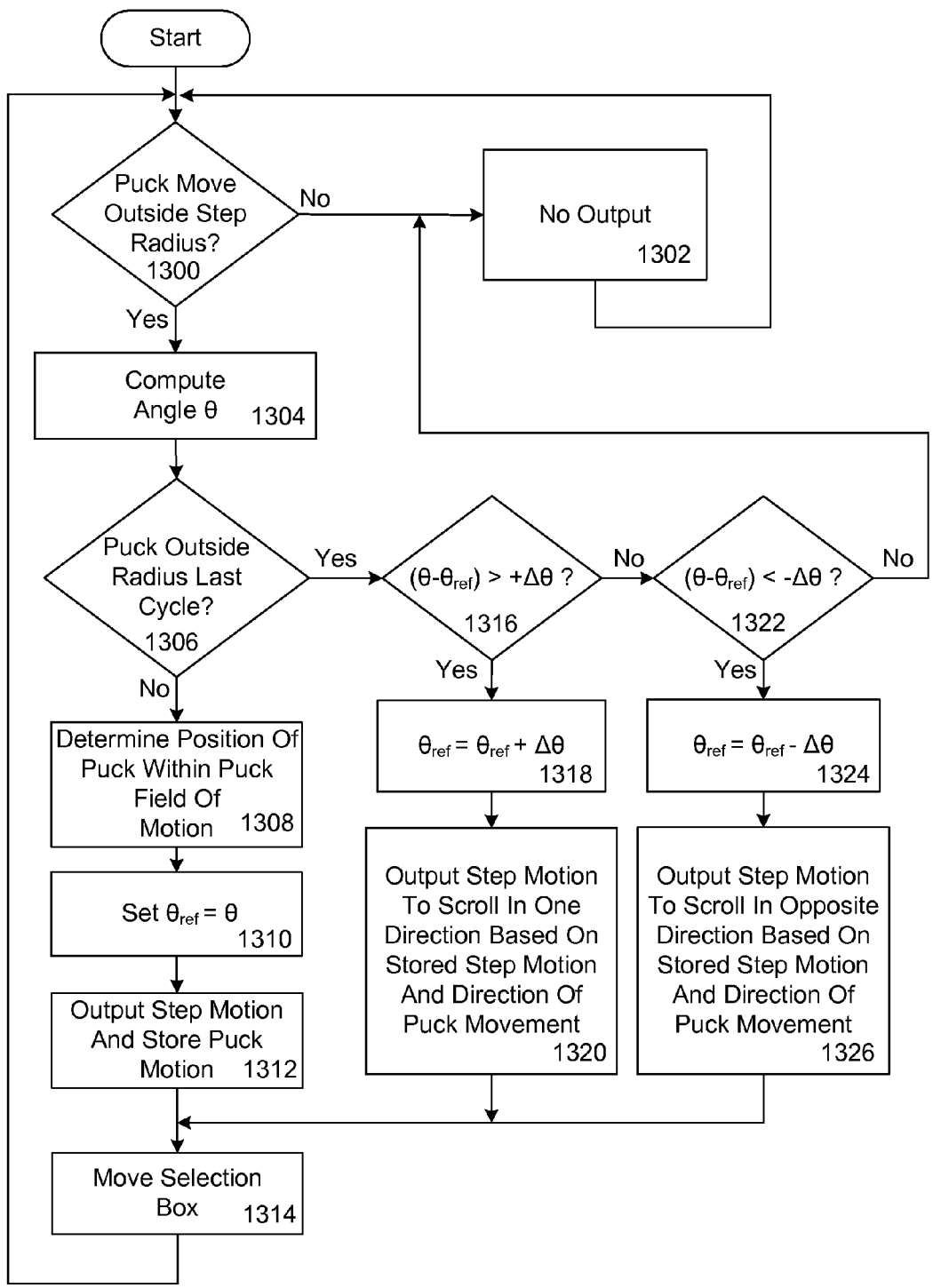
FIG. 13 is a flowchart of a first method for implementing block 810 shown in FIG. 8 in an embodiment in accordance with the invention.

FIG. 13 is a flowchart of a first method for implementing block 810 shown in FIG. 8 in an embodiment in accordance with the invention. Initially a determination is made at block 1300 as to whether the user has moved the puck outside the step radius. The techniques described in conjunction with FIGS. 10 and 11 are used to determine whether the puck is outside the step radius in an embodiment in accordance with the invention. The pointing device does not generate an output if the user has not moved the puck past the step radius (block 1302).

If the user has moved the puck outside the step radius, an angle θ (theta) is computed at block 1304. The angle θ is computed using the technique shown in FIG. 11 in an embodiment in accordance with the invention. A determination is then made at block 1306 as to whether the puck was outside the step radius in the previous cycle.

If the puck was not outside the step radius in the previous cycle, the position of the puck within the puck field of motion is determined at block 1308. The position of the puck is determined using the angle θ and the locations of lines 1100, 1102 (FIG. 11) in an embodiment in accordance with the invention.

A reference angle ($\theta_{ref}$) is then set to the angle θ, as shown in block 1310. The pointing device outputs a step motion that is based on the movement of the puck. The pointing device also stores the position the user moved the puck (block 1312). Thus, the pointing device recognizes the puck motion by outputting a step motion and remembers the puck motion by storing the position data in the embodiment shown in FIG. 13. The pointing device or a host device then moves the selection box pursuant to the outputted step motion (block 1314).

Referring again to block 1306, if the puck was outside the step radius in the previous cycle, a determination is made as to whether the difference between the current angle and the reference angle ($\theta_{ref}$) is greater than a predetermined positive angle change (+Δθ) (block 1316). If the difference between the angles is greater than a positive predetermined angle change, the method passes to block 1318 where the reference angle ($\theta_{ref}$) is recomputed using the equation $\theta_{ref}=\theta_{ref}+\Delta\theta$. The pointing device then outputs a step motion (block 1320) that causes the selection box to scroll in a direction that is based on the stored step motion and the direction of the puck movement (block 1314).

The selection box moves in one dimension in the embodiment shown in FIG. 13. For example, if the user moves the puck from its resting position upwards or north and then begins moving the puck in a clockwise direction around the puck field of motion, the selection box would first step one position upwards and then begin scrolling downwards or in a southerly direction. Alternatively, if the user moves the puck from its resting position to the right and then begins moving the puck in a clockwise direction around the puck field of motion, the selection box would first step one position to the right and then begin scrolling from left to right.

If the difference between the angles is not greater than a positive predetermined angle change (block 1316), the method passes to block 1322 where the difference between the current angle θ and the reference angle $\theta_{ref}$ is analyzed to determine whether the difference is less than a negative predetermined angle change (−Δθ). If the difference is less than a negative predetermined angle change (−Δθ), the reference angle ($\theta_{ref}$) is recomputed using the equation $\theta_{ref}=\theta_{ref}-\Delta\theta$ (block 1324). The pointing device then outputs a step motion (block 1326) that causes the selection box to scroll in a direction that is based on the stored step motion and the direction of the puck movement (block 1326).

The direction indicated in block 1326 is the opposite direction of the direction output in block 1320 in an embodiment in accordance with the invention. Thus, using one of the examples described earlier, if the user moves the puck from its resting position to the right and then begins moving the puck in a counter-clockwise direction around the puck field of motion, the selection box would first step one position to the right and then begin scrolling from right to left for block 1326.

Figure 14:
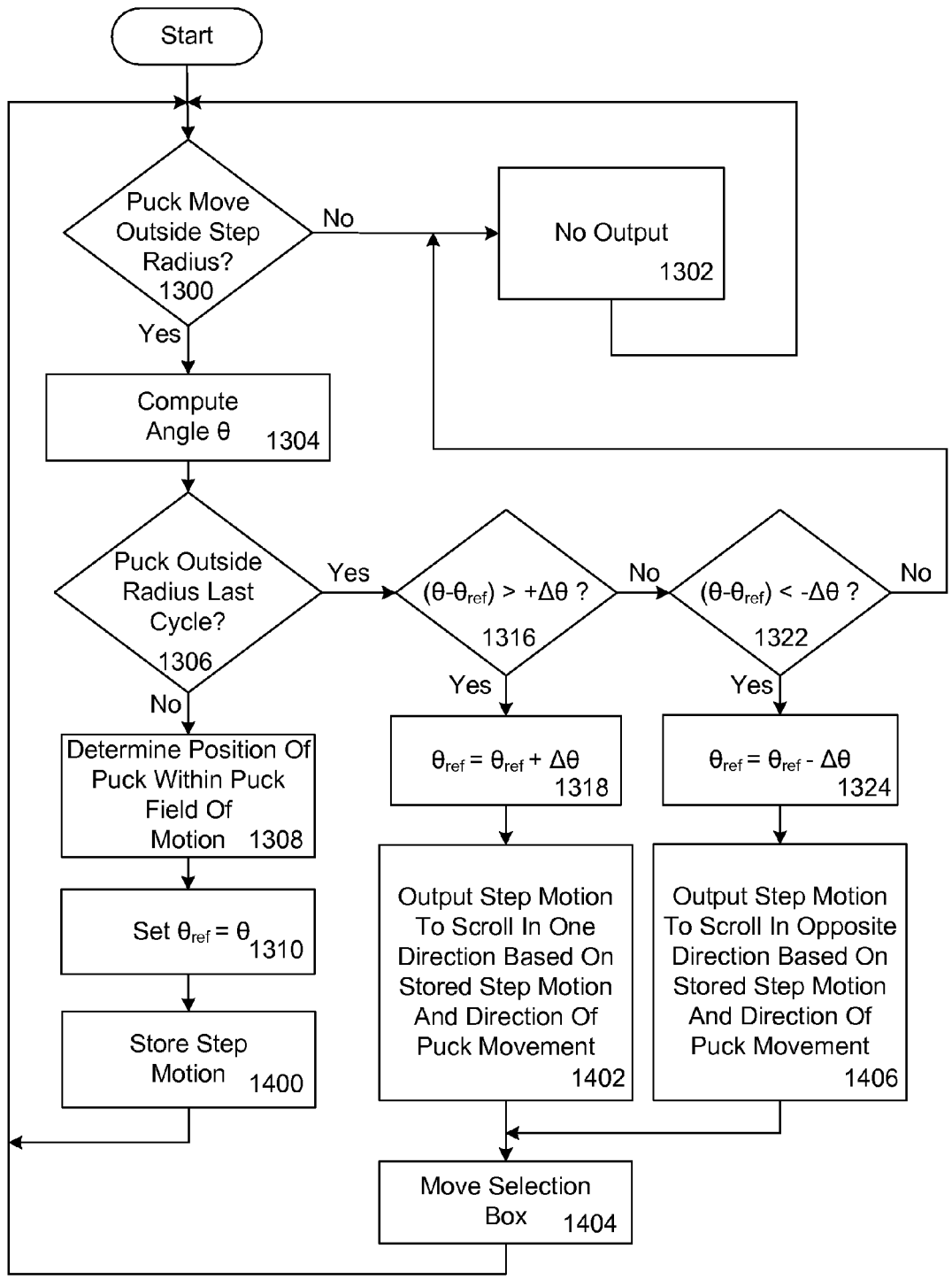
FIG. 14 is a flowchart of a second method for implementing block 810 shown in FIG. 8 in an embodiment in accordance with the invention.

Referring now to FIG. 14, there is shown a flowchart of a second method for implementing block 810 shown in FIG. 8 in an embodiment in accordance with the invention. The method is similar to the method shown in FIG. 13 except that block 1400 is substituted for block 1312, block 1402 is substituted from block 1320, and block 1406 is substituted for block 1326. The method shown in FIG. 13 remembers the puck motion by storing the position data at block 1400 but does not recognize the puck motion. Thus, the pointing device does not output a step motion at block 1400.

The selection box is moved in the embodiment of FIG. 14 only after the user moved the puck outside the step radius in a previous cycle (block 1306). The selection box moves in only one dimension and that dimension is determined by the initial movement of the puck. For example, if the user moves the puck from its resting position to the right and then begins to move the puck in a clockwise direction around the puck field of motion, the selection box would scroll from left to right. Note that the pointing device does not output a step motion in response to the initial movement of the puck to the right. But the initial movement of the puck causes the selection box to scroll in a left to right direction or in a right to left direction, depending on the direction the puck is moved around the puck field of motion.

When the puck was outside the step radius in the previous cycle (block 1306), the reference angle ($\theta_{ref}$) is subtracted from the current angle $\theta$ and the difference between the angles is compared to a predetermined positive angle change ($+\Delta\theta$). If the difference between the angles is greater than a positive predetermined angle change (block 1316), the method passes to block 1318 where the reference angle ($\theta_{ref}$) is recomputed using the equation $\theta_{ref}=\theta_{ref}+\Delta\theta$. The pointing device then outputs a step motion that causes the selection box to scroll in a direction that is based on the step motion stored at block 1400 and the direction of the puck movement. These steps are shown in blocks 1402 and 1404.

If the difference between the angles is not greater than a positive predetermined angle change (block 1316), the method passes to block 1322 where the difference between the current angle $\theta$ and the reference angle $\theta_{ref}$ is analyzed to determine whether the difference is less than a negative predetermined angle change ($-\Delta\theta$). If the difference is less than a negative predetermined angle change ($-\Delta\theta$), the reference angle ($\theta_{ref}$) is recomputed using the equation $\theta_{ref}=\theta_{ref}-\Delta\theta$ (block 1324). The pointing device then outputs a step motion that causes the selection box to scroll in a direction that is based on the step motion stored at block 1400 and the direction of the puck movement. These steps are shown in blocks 1406 and 1404. The direction indicated in block 1406 is the opposite direction of the direction output in block 1402 in an embodiment in accordance with the invention.

Figure 15:
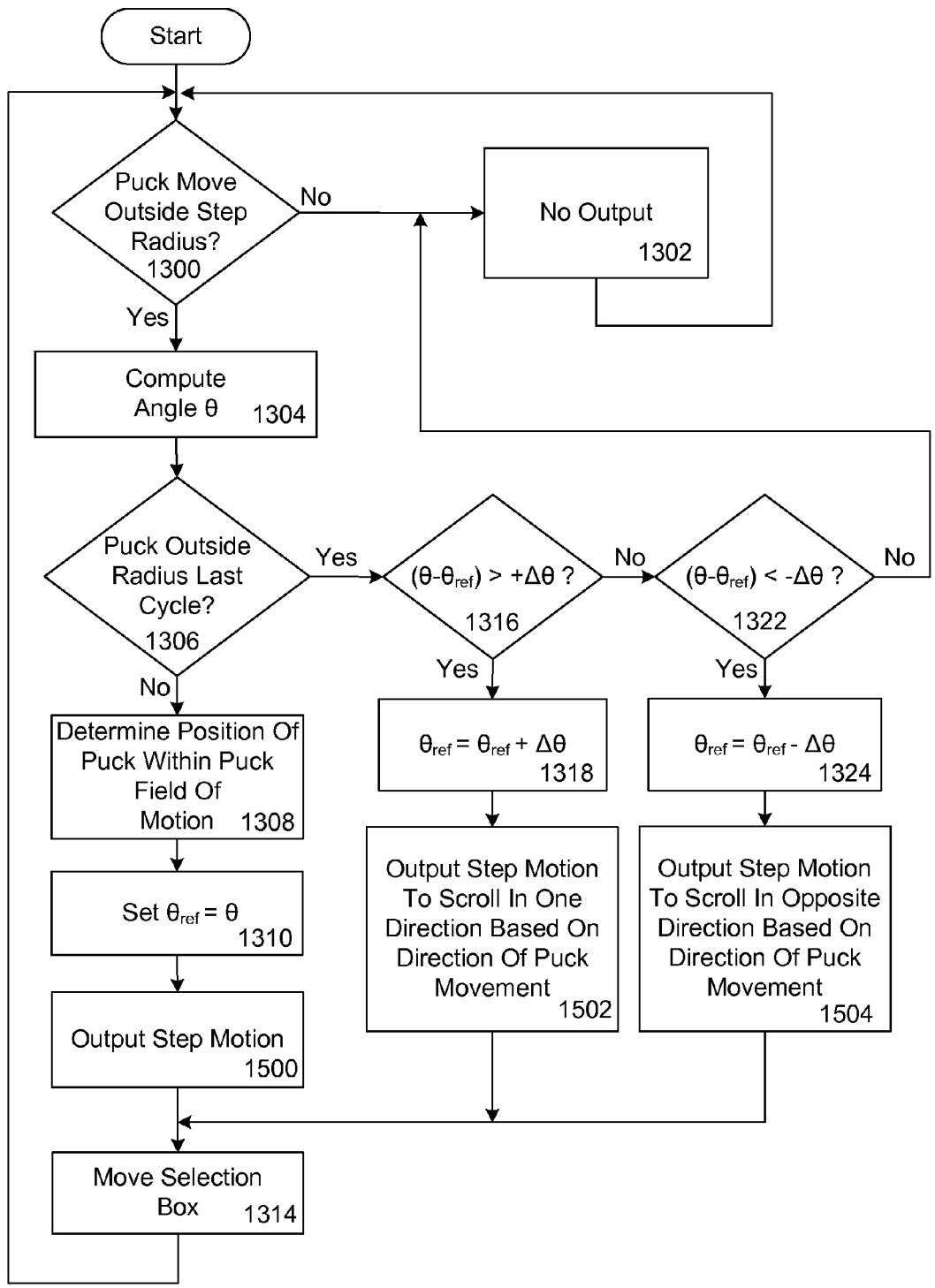
FIG. 15 is a flowchart of a method for implementing block 814 shown in FIG. 8 in an embodiment in accordance with the invention.

FIG. 15 is a flowchart of a method for implementing block 814 shown in FIG. 8 in an embodiment in accordance with the invention. The method shown in FIG. 15 causes a selection box to move in either one dimension or in two dimensions. The method is similar to the method shown in FIG. 13 except that block 1500 is substituted for block 1312, block 1502 is substituted from block 1320, and block 1504 is substituted for block 1326. The method shown in FIG. 15 recognizes but does not remember the initial puck motion. Thus, the pointing device outputs a step motion at block 1500 but does not store the puck motion.

As discussed earlier, the selection box can move in one or two dimensions with the method shown in FIG. 15. For example, if the user moves the puck from its resting position to the right and then begins to move the puck in a clockwise direction around the puck field of motion, the selection box would first move one position to the right and then begin scrolling in a downward direction. Thus, the selection box moves in two dimensions.

Alternatively, if the user moves the puck upwards and then begins to move the puck in a counter-clockwise direction, the selection box would first move one position upwards and then begin scrolling in an upwards direction. In this example the selection box moves in one dimension. The scrolling direction is based on whether the user is moving the puck in a clockwise or counter-clockwise circular direction in an embodiment in accordance with the invention. The selection box moves down when the puck is moved clockwise around the puck field of motion and up when the puck is moved counter-clockwise in an embodiment in accordance with the invention.

Referring now to block 1306 in FIG. 15, when the puck was outside the step radius in the previous cycle, the reference angle ($\theta_{ref}$) is subtracted from the current angle $\theta$ and the difference between the angles is compared to a predetermined angle change ($+\Delta\theta$). If the difference between the angles is greater than a positive predetermined angle change (block 1316), the method passes to block 1318 where the reference angle ($\theta_{ref}$) is recomputed using the equation $\theta_{ref}=\theta_{ref}+\Delta\theta$. The pointing device then outputs a step motion that causes the selection box to scroll in a direction that is based on the direction of the puck movement. These steps are shown in blocks 1502 and 1314.

If the difference between the angles is not greater than a positive predetermined angle change (block 1316), the method passes to block 1322 where the difference between the current angle $\theta$ and the reference angle $\theta_{ref}$ is analyzed to determine whether the difference is less than a negative predetermined angle change ($'\Delta\theta$). If the difference is less than a negative predetermined angle change ($'\Delta\theta$), the reference angle ($\theta_{ref}$) is recomputed using the equation $\theta_{ref}=\theta_{ref}-\Delta\theta$ (block 1324). The pointing device then outputs a step motion that causes the selection box to scroll in a direction that is based on the direction of the puck movement (blocks 1504, 1314). The direction indicated in block 1504 is the opposite direction of the direction output in block 1502 in an embodiment in accordance with the invention.

Figure 16:
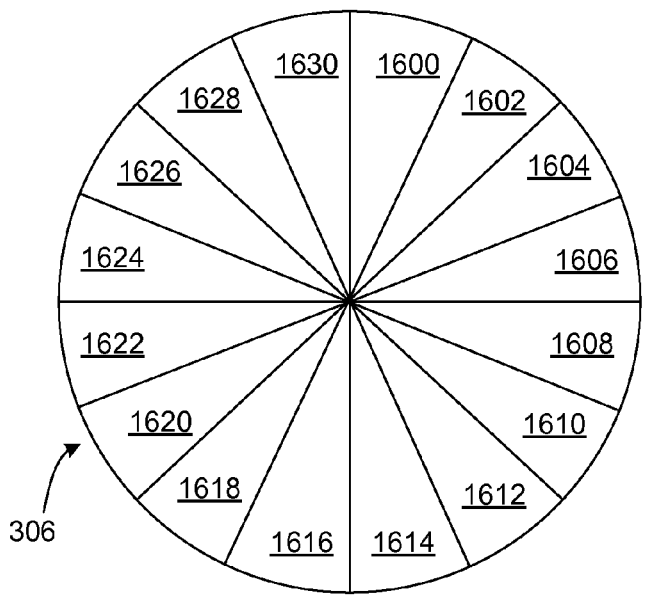
FIG. 16 is a top view of puck field of motion 306 shown in FIG. 3 that is used to illustrate a second method for determining puck position and puck motion in an embodiment in accordance with the invention.

FIG. 16 is a top view of puck field of motion 306 shown in FIG. 3 that is used to illustrate a second method for determining puck position and puck motion in an embodiment in accordance with the invention. Puck field of motion 306 is divided logically into segments 1600-1630. Although FIG. 16 illustrates sixteen segments, other embodiments in accordance with the invention are not limited to this implementation. The puck field of motion can be divided into any number (N) of segments, where N is greater than one. The maximum number of segments is fixed by the physical ability of the pointing device and sensing mechanism to resolve puck position in an embodiment in accordance with the invention.

The number of transitions between segments is counted as the puck circumnavigates the puck field of motion. In one embodiment in accordance with the invention, the center of the conductive puck plate (e.g., 320 in FIG. 3B) with respect to each transition between segments is counted. For example, the transition count is incremented by one when the center of the conductive puck plate moves from segment 1600 to segment 1602.

The direction of puck movement, the count of segment transitions, and the output rate of the count are used to generate position, direction, and speed information for the selection box in an embodiment in accordance with the invention. The direction of the movement of the selection box is based on whether the user is moving the puck in a clockwise or counter-clockwise circular direction. The selection box moves down when the puck is moved clockwise around the puck field of motion and up when the puck is moved counter-clockwise in an embodiment in accordance with the invention. Moreover, a certain number of segments may initially need to be traversed before scrolling begins in order to avoid accidental or erroneous scrolling in embodiments in accordance with the invention.

Figure 17:
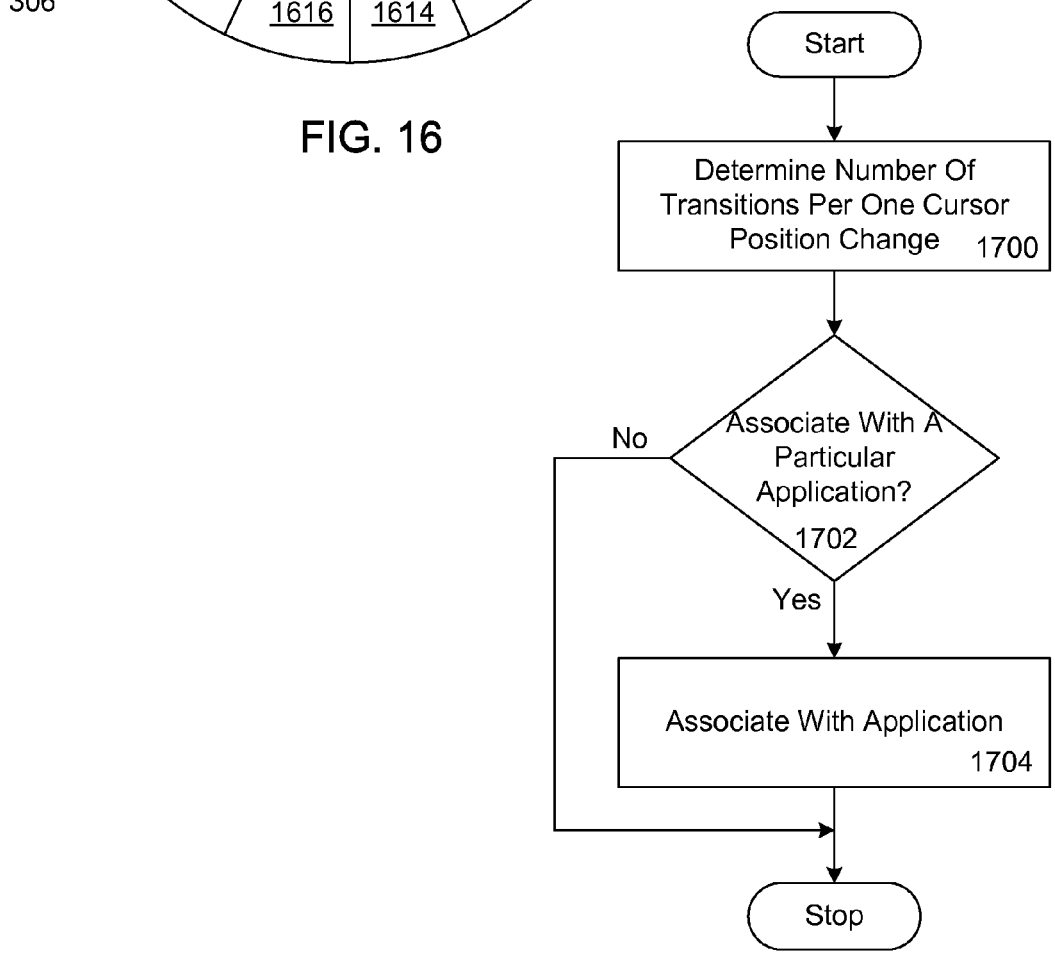
FIG. 17 is a flowchart of a method for associating a wheel-style or rocker-style navigation method with an application in an embodiment in accordance with the invention.

Referring now to FIG. 17, there is shown a flowchart of a method for determining puck speed in an embodiment in accordance with the invention. Initially the number of transitions per one step is programmed, as shown in block 1700. The number of segment transitions described in conjunction with FIG. 16 that represent one step change is programmed in an embodiment in accordance with the invention. In another embodiment in accordance with the invention, the number of changes in the angle θ is programmed at block 1700.

The number of transitions is determined and programmed by a user in an embodiment in accordance with the invention. The user can program the number of segment transitions per step change using one of several techniques. For example, the number of segment changes per step change is programmed through a user interface in an embodiment in accordance with the invention. In another embodiment in accordance with the invention, the number of segment transitions that represent one step change is determined and programmed by a pointing device manufacturer or host device manufacturer. And in yet another embodiment in accordance with the invention, the number of steps is dynamically adjusted to correspond with the speed at which the puck circumnavigates the perimeter.

When the number of transitions per step change is set to a low value, the selection box moves more quickly around items displayed on the display, in a user interface, or in lists or data. Alternatively, the selection box moves more slowly when the number of transitions per step change is higher. This can provide a user with more control of the selection box.

A determination is then made at block 1702 as to whether the number of transitions per step change is to be associated with a particular application. A user may want the selection box to move more quickly when the user is interacting with an application that requires the user to navigate through a long list of items. Examples of such applications include, but are not limited to, music and e-mail applications. The user or device software is therefore able to customize screen navigation based on the type of application by creating a step movement profile for each application.

When the programmed number of transitions per step change is to be associated with the application, the method passes to block 1704. The number of transitions per step change can be associated with an application using one of a number of techniques. By way of example only, the data may be stored in a database or in a preferences file in memory.

The invention claimed is:

1. An analog pointing device for emulating at least one of wheel-style navigation, rocker-style navigation, and wheel-and-rocker style navigation with a selection box shown on a display, the pointing device comprising:
 a control mechanism controllable by a user, wherein a field of motion is associated with the control mechanism; and
 a position determining mechanism operable to determine whether the control mechanism has moved outside a step radius, wherein the step radius is defined within the field of motion and to determine a position of the control mechanism within the field of motion if the control mechanism has moved outside the step radius, the position determining mechanism being further operable to output at least one step motion when the control mechanism has moved outside the step radius to emulate at least one of the wheel-style navigation, the rocker-style navigation, and the wheel-and-rocker style navigation, wherein the at least one step motion causes the selection box to move from a current position to a position adjacent the current position.

2. The analog pointing device of claim 1, wherein the at least one step motion generated by the position determining mechanism causes the selection box to move a single position adjacent the current position.

3. The analog pointing device of claim 1, wherein the at least one step motion generated by the position determining mechanism causes the selection box to repeatedly move one position adjacent the current position.

4. The analog pointing device of claim 1, wherein the position determining mechanism determines the position of the control mechanism within the field of motion by comparing a current distance the control mechanism moved and a current angle of the movement with a previous distance and a previous angle, respectively.

5. The analog pointing device of claim 1, wherein the field of motion is logically divided into two or more sections and the position determining mechanism is operable to determine the position of the control mechanism based on a respective section the control mechanism is moved into by the user.

6. The analog pointing device of claim 1, wherein the field of motion includes a step region logically defined within the field of motion.

7. A method for display screen navigation using an analog pointing device, the method comprising:
 determining a position of a control mechanism within the field of motion;
 determining whether to implement cursor-style navigation, and if so, implementing cursor style navigation; and
 if not implementing cursor-style navigation, emulating at least one of wheel-style navigation, rocker-style navigation, and wheel-and-rocker style navigation,
 wherein emulating at least one of wheel-style navigation, rocker-style navigation, and wheel-and-rocker style navigation comprises:
 determining whether to enter a step mode and if so, outputting a step motion based on the position of the control mechanism within the field of motion, wherein the step motion causes a selection box to move one adjacent position on the display screen;
 determining whether to enter a scroll mode and if so, repeatedly outputting a step motion based on the position of the control mechanism within the field of motion, wherein repeatedly outputting a step motion causes the selection box to repeatedly move one adjacent position on the display screen in a direction that is based on a direction of movement of the control mechanism; and
 determining whether to output a step motion based on an initial position of the control mechanism within the field of motion and then repeatedly outputting a step motion based on subsequent positions of the control mechanism within the field of motion, wherein repeatedly outputting a step motion causes the selection box to repeatedly move one adjacent position on the display screen in a direction that is based on a direction of movement of the control mechanism.

8. The method of claim 7, further comprising outputting a step motion based on the initial position of the control mechanism and then repeatedly outputting a step motion based on subsequent positions of the control mechanism within the field of motion.

9. The method of claim 7, further comprising storing the initial position of the control mechanism.

10. The method of claim 9, further comprising not outputting a step motion based on the initial position of the control mechanism and then repeatedly outputting a step motion to cause the selection box to repeatedly move in a direction that is based on the stored position and the subsequent positions of the control mechanism.

11. The method of claim 9, further comprising outputting a step motion based on the initial position of the control mechanism and then repeatedly outputting a step motion to cause the selection box to repeatedly move in a direction that is based on the stored position and the subsequent positions of the control mechanism.

12. The method of claim 7, further comprising determining whether the control mechanism has moved into a step region within the field of motion prior to outputting a step motion.

13. A method for emulating at least one of wheel-style navigation, rocker-style navigation, and wheel-and-rocker style navigation with an analog pointing device, wherein the analog pointing device is associated with a display screen and comprises a control mechanism having a field of motion, the method comprising:
  determining whether the control mechanism has moved outside a step radius, wherein the step radius is defined within the field of motion;
  if the control mechanism has moved outside the step radius, determining a position of the control mechanism within the field of motion; and
  outputting one or more step motions when the control mechanism has moved outside the step radius to emulate at least one of wheel-style navigation, rocker-style navigation, and wheel-and-rocker style navigation for a selection box shown on the display screen.

14. The method of claim 13, wherein outputting one or more step motions when the control mechanism has moved outside the step radius comprises outputting a single step motion based on the position of the control mechanism within the field of motion.

15. The method of claim 13, wherein outputting one or more step motions when the control mechanism has moved outside the step radius comprises repeatedly outputting step motions based on the position of the control mechanism within the field of motion.

16. The method of claim 13, further comprising storing the position of the control mechanism when the control mechanism initially moves outside the step region.

17. The method of claim 16, wherein outputting one or more step motions when the control mechanism has moved outside the step radius comprises outputting a single step motion based on the stored position and then repeatedly outputting step motions based on the stored position and a direction of movement of the control mechanism.

18. The method of claim 16, wherein outputting one or more step motions when the control mechanism has moved outside the step radius comprises repeatedly outputting step motions based on the stored position and a direction of movement of the control mechanism.

19. The method of claim 13, further comprising entering an auto-repeat mode when the control mechanism remains outside the step radius but does not change position.

* * * * *